United States Patent
Watson et al.

(10) Patent No.: US 8,117,324 B2
(45) Date of Patent: Feb. 14, 2012

(54) SYSTEM AND METHOD TO REMOTELY MANAGE AND AUDIT SET TOP BOX RESOURCES

(75) Inventors: P. Thomas Watson, Alpharetta, GA (US); Scott R. Swix, Duluth, GA (US); James H. Gray, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 939 days.

(21) Appl. No.: 11/250,086

(22) Filed: Oct. 13, 2005

(65) Prior Publication Data

US 2006/0031406 A1 Feb. 9, 2006

Related U.S. Application Data

(62) Division of application No. 10/029,173, filed on Dec. 28, 2001.

(51) Int. Cl.
*G06F 15/16* (2006.01)
(52) U.S. Cl. .................. 709/229; 709/224; 709/225
(58) Field of Classification Search .................. 709/203, 709/217–219, 223–226, 229; 725/107, 139–141, 725/151–153
See application file for complete search history.

(56) References Cited

U.S. PATENT DOCUMENTS

| | | | | |
|---|---|---|---|---|
| 5,948,101 | A * | 9/1999 | David et al. | 713/2 |
| 6,445,907 | B1 * | 9/2002 | Middeke et al. | 455/226.1 |
| 6,532,593 | B1 * | 3/2003 | Moroney | 725/142 |
| 6,718,374 | B1 * | 4/2004 | Del Sordo et al. | 709/220 |
| 6,742,182 | B1 * | 5/2004 | Perlman | 725/25 |
| 6,754,908 | B1 * | 6/2004 | Medvinsky | 725/107 |
| 6,799,208 | B1 * | 9/2004 | Sankaranarayan et al. | 709/223 |
| 6,915,531 | B2 * | 7/2005 | Yun | 725/131 |
| 6,928,653 | B1 * | 8/2005 | Ellis et al. | 725/50 |
| 7,017,178 | B1 | 3/2006 | Hendricks et al. | |
| 7,024,461 | B1 * | 4/2006 | Janning et al. | 709/207 |
| 7,430,585 | B2 * | 9/2008 | Sibert | 709/216 |
| 7,444,561 | B2 * | 10/2008 | Korkishko et al. | 714/718 |
| 7,493,662 | B2 * | 2/2009 | Murase et al. | 726/33 |
| 7,565,678 | B2 * | 7/2009 | Watson et al. | 725/132 |
| 7,590,996 | B2 * | 9/2009 | Medvinsky | 725/107 |
| 2002/0161832 | A1 * | 10/2002 | Brebner | 709/203 |
| 2006/0021037 | A1 * | 1/2006 | Zhuk et al. | 726/22 |
| 2007/0067643 | A1 * | 3/2007 | Zhuk et al. | 713/187 |

* cited by examiner

*Primary Examiner* — Faruk Hamza
(74) *Attorney, Agent, or Firm* — Guntin Meles & Gust, PLC; Pablo Meles

(57) ABSTRACT

A system and method for determining the resources available or used in a remote device is disclosed. The system can be used to determine whether the remote device is using expected resources as originally configured or to determine whether resources are available to support new or extended services. The method can be used to configure or reconfigure the remote device for its intended use or as reconfigure a remote device for new, different or extended purposes.

20 Claims, 3 Drawing Sheets

SYSTEM AND METHOD TO REMOTELY MANAGE AND AUDIT SET TOP BOX RESOURCES

The present Application is a Division of application Ser. No. 10/029,173, filed on Dec. 28, 2001.

BACKGROUND

1. Field of the Invention

The present invention relates generally to a content distribution system, and more particularly, to system and method to remotely manage and audit set top box (referred to as "STB") resources.

2. Background of the Invention

Many dwellings including single homes, apartments, condominiums, town houses and lofts, have installed a media distribution system to improve the reception of audio and video content. Often, these distribution systems take the form of either a cable television system or a satellite television system. These systems receive a signal from a content supplier, such as a cable television company or a satellite television company. Generally, content suppliers offer a variety of services including different levels of subscriptions, pay channels and pay per view programs. Additionally, newer STBs, like Tivo, Replay TV and Ultimate TV, include computing resources including processors, hard disk drives, controllers, and operating systems.

Some customers, in an effort to access unauthorized channels or services, attempt to modify their STBs. For example, there have been problems with users opening their STBs and installing larger disk drives, and installing memory cards that provide the codes necessary to access unauthorized channels and services. Other forms of unauthorized use of STBs and the resources associated with STBs have also occurred.

SUMMARY OF THE INVENTION

The present invention is directed to an STB that includes a remote resource manager (referred to as "RRM"). RRMs permit a service provider to monitor the resources that are associated with an STB and determine if all the resources associated with that STB are authorized. The service provider can initiate communications with an STB and, using the RRM, the service provider can essentially audit an STB and determine the available resources and/or configuration of the STB.

In one aspect, the service provider sends an interrogation signal to an RRM and the RRM responds to this interrogation signal by sending information related to the resources that are associated with the STB.

In another aspect, the service provider sends a signal that instructs an RRM to collect information related to the resources that are associated with STB.

In another aspect, the invention is directed to a method that includes provisions that permit the service provider to compare the configuration of the STB with an expected configuration and determine if the current configuration is different from the expected configuration.

In another aspect, the invention allows the service provider to modify an STB remotely by sending information to the remote resource manager.

In another aspect, the RRM can determine if a STB can support a new service requested by the user based on the presently available resources.

Additional features and advantages of the invention will be set forth in the description which follows, and in part will be apparent from the description, or may be learned by practice of the invention. The objectives and advantages of the invention will be realized and attained by the structure and steps particularly pointed out in the written description, the claims and the drawings.

DETAILED DESCRIPTION OF THE INVENTION

Figure 1:
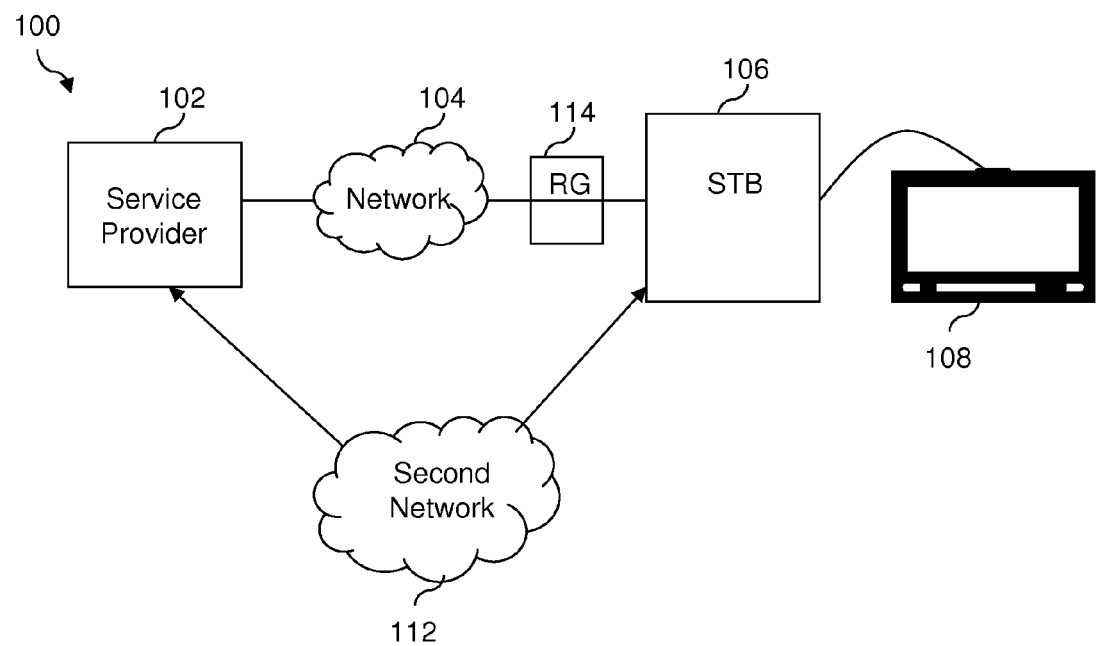
FIG. 1 is a schematic diagram of a preferred embodiment of a system in accordance with the present invention.

FIG. 1 is a schematic diagram 100, portions of which show a preferred embodiments of the present invention. A service provider 102, which could be a network operator, is connected to network 104. Network 104 could be cable, terrestrial broadcast, satellite broadcast, or a combination of those forms. At least one STB 106 is connected to network 104. Usually, more than one STB 106 is connected to Network 104. However, for purposes of clarity, this description focuses on a single STB 106, keeping in mind that many more STBs could be connected to Network 104.

In addition to being connected to network 104, STB 106 is also preferably connected to a television 108. Preferably, service provider 102 distributes content through network 104 and STB 106 is adapted to receive that content and deliver it to television 108. In some embodiments, a residential gateway 114.

Residential gateway (RG) 114 is generally a device for terminating an external connection and fanning it out to multiple devices within a dwelling. In some embodiments, residential gateway 114 is a STB. Typically residential gateway 114 serves more than one purposes such as a DHCP server or as a NAT server for connections to the internet through an ISP. Residential gateway 114 can include storage, and in some cases residential gateway 114 is a managed device by the network provider.

In some cases, STB 106 includes a tuner that permits a user to access different programs or channels. In the preferred embodiment, STB 106 is connected to a second network 112. Typically, second network 112 is a telecommunications network and in some embodiments, second network 112 is a public switched telecommunications network ("PSTN"). Preferably, this second network 112 is capable of supporting Internet Protocol ("IP") communications. Preferably, network 112 supports two way communications between service provider 102 and STB 106. In some embodiments, second network 112 is a "broadband" network, for example, DSL, cable modem, Ethernet, or some other network that supports high speed communications. While the embodiment shown in FIG. 1 shows STB 106 as a physically separate unit from associated television 108, it is possible to integrate an STB with a television. In such integrated units, the STB can be built into the television.

Figure 2:
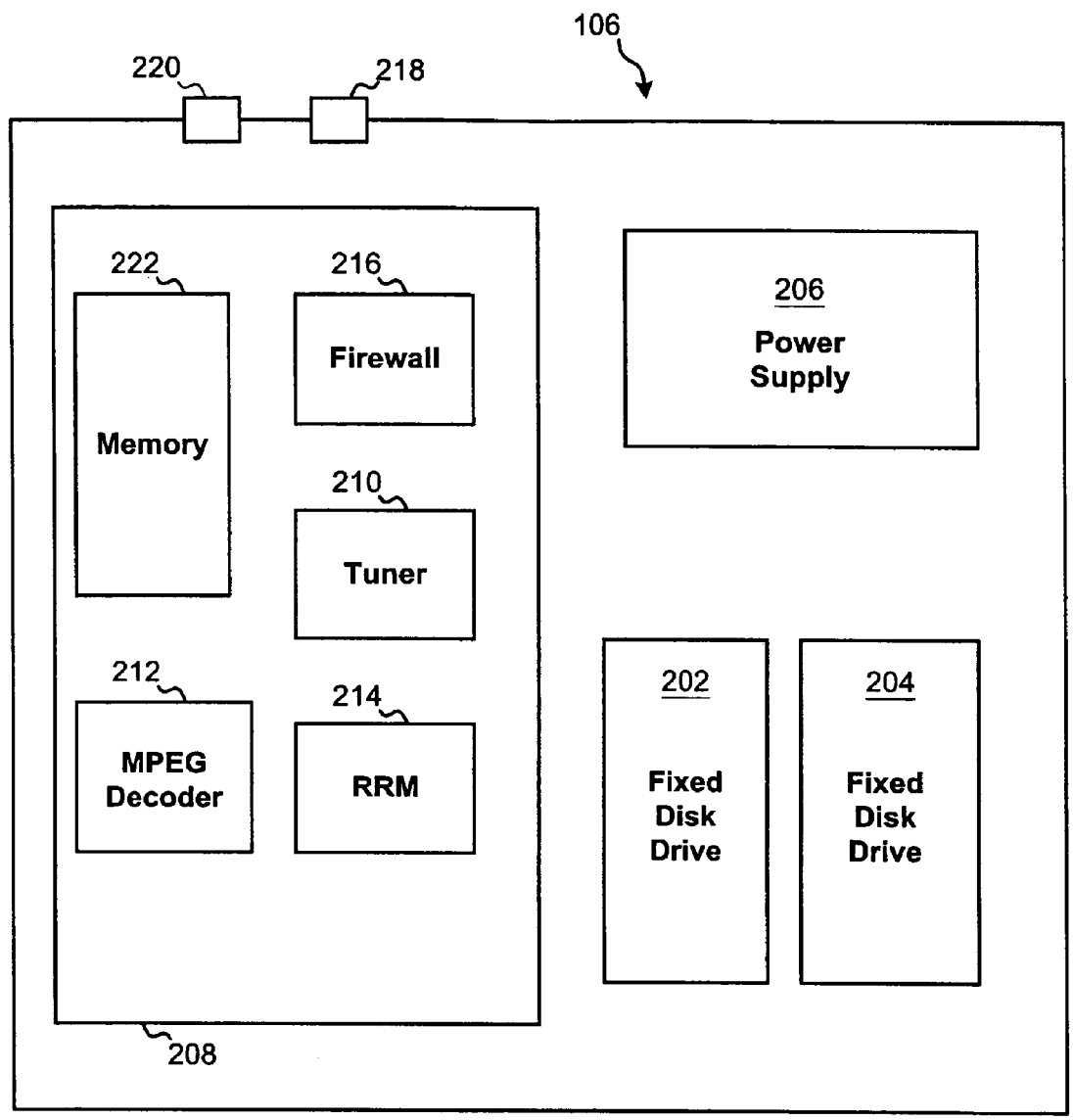
FIG. 2 is a schematic diagram of a preferred embodiment of a set top box in accordance with the present invention.

In some embodiments, STB 106 includes various resources that assist STB 106 in providing services to users. Referring to an embodiment of STB 106 shown in FIG. 2 STB 106 can include several components including a computer readable storage medium such as a fixed disk drive 202 that can be used to record content, and a second fixed disk drive 204 that could be used to provide increased storage capacity. A power supply 206 can be connected to a power source and to various components to provide power to those components. STB 106 can also include a first port 218, also referred to as a network port, capable of communicating with first network 104 (see FIG. 1) and a second port 220, also referred to as a communications port, capable of communicating with second network 112 (see FIG. 1).

STB 106 can also include a motherboard 208 that supports various other components. For example, in some embodiments, motherboard 208 can include a tuner 210 that can assist a user in selecting programs. A decoder 212 could be provided to assist in converting images from a digital format to a format suitable for display on a television. In one embodiment, decoder 212 is an MPEG-2 (Motion Picture Experts Group) decoder.

A remote resource manager (referred to as "RRM") 214 could also be associated with STB 106. In some embodiments, RRM 214 is attached to motherboard 208, in other embodiments, RRM 214 is a separate component that is located within or on STB 106 and RRM 214 is in communication with motherboard 208, and in other embodiments, RRM 214 is located outside STB 106 and is either attached or not attached to STB 106, and is in communication with motherboard 208. In some embodiments the RRM is a software program, such as a computer readable storage medium comprising a program, application or algorithm that operates inside or outside the STB 106.

RRM 214 is designed to determine resources that are associated with a particular STB. In the embodiment shown in FIG. 2, RRM 214 is located within STB 106 and RRM 214 is designed to determine the resources associated with STB 106. In some embodiments, RRM 214 is designed to determine the resources that are associated with STB 106 at predetermined times, in other embodiments, RRM 214 determines the associated resources in response to a signal. Exactly when RRM 214 determines the nature and quality of the resources associated with STB 106 can be tailored to suit particular preferences and needs.

Some embodiments include an optional firewall 216. In some embodiments, firewall 216 is attached to motherboard 208. In other embodiments, firewall 216 is a separate component that is located within or on STB 106 and is in communication with motherboard 208, and in other embodiments, firewall 216 is located outside STB 106 and is either attached or not attached to STB 106, and is in communication with motherboard 208.

Firewall 216 can be hardware, software or a combination of the two. Firewall 216 is designed to protect STB 106 from unauthorized access. Firewall 216 is in communication with communications port 218. In some embodiments, communications port 218 is a modular port, for example, an RJ-11 or an RJ-45. Since STB 106 is connected to a communications network 112 (see FIG. 1) and because many different people have access to communications network 112, STB 106 may be vulnerable to unauthorized access or hacker attack.

To assist in preventing unauthorized access by third parties, firewall 216 is disposed logically between communications network 112 and other components of STB 106. In other words, firewall 216 receives information from communications network 112 before other elements of STB 106 and information from communications network 112 is sent to other components of STB 106 after firewall 216 has reviewed, analyzed, and or processed the information.

Firewall 216 can include filters, packet filtering, proxy service, and/or stateful inspection. Firewall 216 can process and/or analyze one or more communications protocols. Some examples of communications protocols that firewall 216 may be designed to process and/or analyze are: IP (Internet Protocol), TCP (Transport Control Protocol), HTTP (Hyper Text Transfer Protocol), FTP (File Transfer Protocol), UDP (User Datagram Protocol), ICMP (Internet Control Message Protocol), SMTP (Simple Mail Transport Protocol), SNMP (Simple Network Management Protocol), and/or Telnet.

Figure 3:
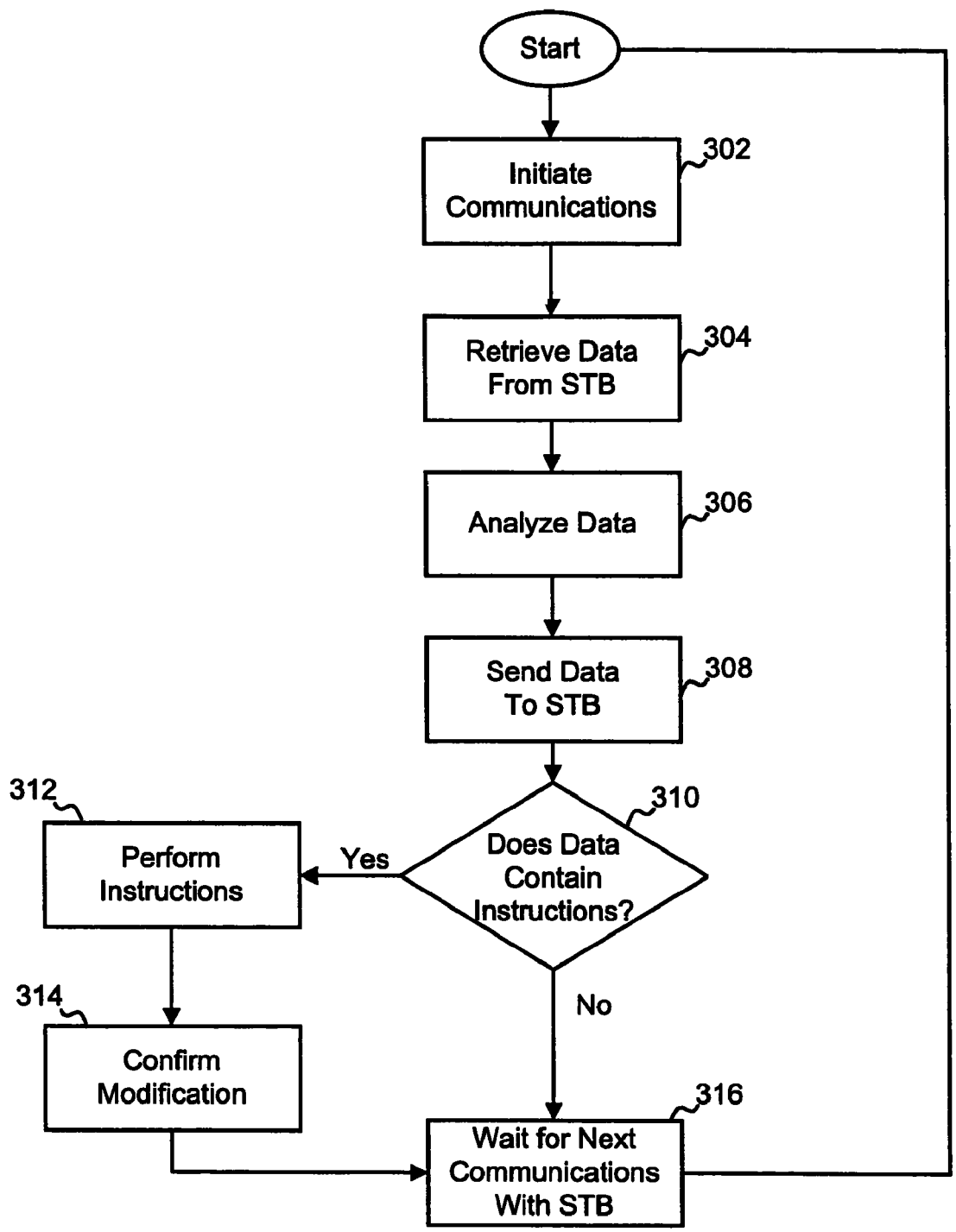
FIG. 3 is a flow diagram of a preferred embodiment of a method in accordance with the present invention.

FIG. 3 shows a flow diagram of a preferred embodiment of a method in accordance with the present invention. In Step 302, communication is initiated between service provider 102 and STB 106. Preferably this communication occurs over second network 112. As noted above, communication can be initiated in many different ways.

In one embodiment, communication is initiated by STB 106 at predefined intervals. For example, STB 106 initiates communications at a time when it is likely that users are not operating STB. In some embodiments, STB 106 initiates communications at 2:00 or 3:00 in the morning. STB 106 initiates communications by sending a signal over second network 112 to service provider 102. After receiving the signal, service provider 102 and STB 106 begin communications.

In other embodiments, service provider 102 initiates communications by sending the signal, preferably over second network 112, to STB 106. STB 106 responds to the signal from the service provider 102, and two-way communications between STB 106 and service provider 102 commences. In this embodiment, service provider 102 can initiate communications at predetermined times or service provider 102 can initiate communications manually by having technicians or operators associated with service provider 102 initiating communications.

After communications has been initiated, service provider 102 retrieves data from STB in Step 304. Preferably, RRM 214 participates in the transmission of data to service provider 102. In one embodiment, RRM 214 receives a signal from service provider 102 and in response to that signal, RRM 214 retrieves data related to the various resources associated with STB 106.

The data can include information related to the resources associated with STB 106. This information could include the number, nature, type, kind, and/or quality of components connected to or associated with STB 106 as well as the capabilities of those components. For example, in one embodiment, STB 106 uses RRM 214 to send information to service provider 102 regarding the number and size of all of the fixed disk drives that are associated with STB 106. RRM 214 can send the information automatically or in response to a second signal or request from service provider 102.

In Step 306, service provider 102 analyzes the data received from STB 106. In some embodiments, service provider 102 has access to a database or other storage facility that contains information related to STB 106. The information contained in the database relates to the configuration that service provider 102 expects of STB 106. For example, if the user of STB 106 has paid for a specific level of content and a specific size of an associated fixed disk drive 202, this information would be recorded in the database. For example, if user of STB 106 paid for basic subscription content plus a 10 gigabyte fixed disk drive, that information would be captured and recorded in the database.

Once the information related to the resources associated with STB 106 is received from STB 106, that information is compared with the information in the database. All differences between the information received from STB 106 and information retrieved from the database are noted.

For example, if the user has installed another fixed disk drive 204, or has changed the first fixed disk drive 202 to a different capacity fixed disk drive, and none of these modifications were authorized by service provider 102, service provider 102 can detect such unauthorized modifications in Step 306 where service provider 102 analyzes data from STB 106.

In step 308, data is sent from service provider 102 to STB 106. This is an optional step and need not be preformed. However, in some embodiments data could be sent to STB 106 that relates to programming content or information related to future programs. This can assist the user of STB 106 in selecting future programming for viewing and/or recording.

In some cases, service provider 102 will send operating instructions to STB 106. In those cases where service provider 102 sends operating instructions to STB 106, the service provider 102 has detected an unauthorized resource on STB 106 or service provider 102 would like to modify the configuration of STB 106.

In step 308, service provider 102 can send information and operating instructions to STB 106 to reconfigure STB 106 in such a way that the modified STB 106 will again conform to the expected configuration in accordance with the data retrieved from the database. Unauthorized modifications are generally rare, and therefore, these operating instructions are generally infrequently sent to STB 106.

In Step 310, STB 106 determines if an operating instruction has been sent from the service provider. If an operating instruction has been sent from the service provider 102, then STB 106 performs the operating instruction in Step 312. The operating instruction can include instructions that tell STB 106 to modify, disable, fail to address, or fail to use unauthorized resources. In addition, the operating command can also be used to allow or enable additional services, for example, permitting addressing of more HD space for extending record times or allowing extended EPG data, or allocate resources for new services, for example, electronic magazine or games, and/or repartitioning the fixed disk drive for more or less space for PVR or other services.

Continuing with the example, if the expected resource is a 10-gigabyte hard drive, and the user of STB 106 has installed a 20-gigabyte hard drive without authorization, STB 106 would receive an instruction to either disable the 20-gigabyte hard drive or instruct STB 106 to only access 10-gigabytes of the new fixed disk drive.

In some cases, users purchase STBs with more resources than they have initially paid, and as they pay additional money to service provider 102, service provider 102 enables those additional resources already associated with STB 106. In those cases where users have purchased an STB with more capabilities than their subscription level, the operating instruction would instruct STB 106 to use existing resources that it was previously not authorize to use.

For example, a service provider 102 could sell all of their STBs with large hard drives for example, a 200 gigabyte hard drive, and only permit access to certain portions depending on the level of subscription payment. As users pay additional money, they are permitted to access greater and greater portions of their fixed disk drives. An operating instruction from service provider 102 can permit STB 106 to access additional portions of the fixed disk drive.

The operating instructions could be used to instruct STB 106 to receive or decode additional content. This feature could permit a service provider 102 to increase or decrease the level of content or the amount of content that STB 106 is authorized to receive. The operating instructions could also include information related to decrypting keys. By sending certain decrypting keys to STB 106, service provider 102 can control which programs STB 106 can successfully decode and consequently which programs the user of STB 106 can view.

In addition, the operating instructions can be used to determine if additional resources are available, for example, if additional fixed disk resources are available or if the correct processor to support MPEG 4 and/or MPEG 7 decoding in hardware or software is present. The operating instruction could also be used to diagnose software or hardware on an interactive basis with a technician from a remote location.

After the operating instructions have been performed in Step 312, an optional confirmation Step 314 can be performed. In this optional confirmation step, service provider 102 can retrieve information from STB 106 after STB 106 has been instructed to perform the operating instruction. In the confirm modification Step 314, service provider 102 can interrogate STB 106 after the operating instruction has been sent and retrieve information a second time and retrieve the information related to the new configuration, or the resources associated with STB 106. This information could be compared with an expected configuration, thus permitting service provider 102 to determine if the operating instruction was successfully executed by STB 106.

In this way, service provider 102 can confirm whether the modification has been made or not. If the modification was not made, service provider 102 can retransmit the operating instructions to STB 106 or take other corrective action. If the modification has been successful and an appropriate response has been received from STB 106, the process moves to Step 316 where the system waits for the next communications with the STB to occur.

After communications are initiated at the next appropriate interval, the process then moves to Step 302. Using this preferred method, service provider 102 can determined the amount of resources associated with an STB 106, compare those resources with expected resources, and take any necessary corrective action.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A set top box comprising:
   a first connection to a network configured to receive content from the network;

a second connection for sending a signal to a television; and a remote resource manager within the set top box configured to:

detect a hardware resource;

send information about the detected hardware resource including configuration information of the detected hardware resource to equipment of a service provider at a remote location from the set top box to enable the equipment of the service provider to detect a disparity between the information about the detected hardware resource and expected information about the set top box, wherein the configuration information comprises a number of storage devices at the set top box and a size for each of the storage devices at the set top box; and receive from the equipment of the service provider an operating instruction instructing the set top box to perform at least one of modifying, disabling, or fail to use an unauthorized hardware resource responsive to the equipment of the service provider detecting the unauthorized hardware resource in the set-top box, wherein when the detected hardware resource is of a greater capacity than indicated by an initial subscription level, the operating instructions limits access to additional capacity of the hardware resource, and when a higher subscription level is purchased, the operating instruction grants greater access to the hardware resource.

2. The set top box according to claim 1, wherein the remote resource manager retrieves data related to the detected hardware resource and sends the information about the detected hardware resource to the equipment of the service provider.

3. The set top box according to claim 1, wherein the detected hardware resource is a fixed hard disk drive.

4. The set top box according to claim 1, wherein the detected hardware resource is memory without moving parts.

5. The set top box according to claim 1, wherein the detected resource further comprises tuner capabilities.

6. The set top box according to claim 1, wherein the information about the detected resource that the remote resource manager sends to the service provider comprises a number, type and size of all fixed disk drives associated with the set top box.

7. The set top box according to claim 1, wherein the remote resource manager receives from the equipment of the service provider an instruction to reconfigure the set top box such that the set top box conforms to an expected configuration prior to detection of the unauthorized resource.

8. The set top box according to claim 1, wherein the remote resource manager receives from the equipment of the service provider an instruction to disable the detected unauthorized resource.

9. The set top box according to claim 8, wherein the detected unauthorized resource comprises a hard drive which is larger in storage capacity than originally authorized by the service provider.

10. A method comprising:

determining at a set top box a configuration of a detected resource in the set top box, wherein the configuration comprises at least one of a number of storage devices at the set top box and a size of all of the storage devices at the set top box;

sending from the set top box the configuration of the detected resource to equipment of a service provider, enabling the equipment of the service provider to detect a disparity between the configuration of the detected resource and an expected configuration; and receiving from equipment of the service provider an operating instruction instructing the set top box to perform at least one of modifying, disabling, or fail to use an unauthorized resource responsive to the equipment of the service provider detecting the unauthorized resource, wherein when the detected resource is of a greater capacity than indicated by an initial subscription level, the operating instruction limits access to additional capacity of the detected resource and when a higher subscription level is purchased, the operating instruction grants greater access to the detected resource.

11. The method according to claim 10, wherein the detected resource is a fixed hard disk drive coupled to the set top box.

12. The method according to claim 10, wherein the detected resource is memory exceeding an authorized capacity for a predetermined subscription level and wherein the operating instruction instructs the set top box to modify access to only the authorized capacity of the memory for the predetermined subscription level when the equipment of the service provider detects the unauthorized resource.

13. The method according to claim 10, wherein the detected resource relates to tuner capabilities.

14. The method according to claim 10, comprising receiving an instruction to reconfigure the set top box such that the set top box conforms to an expected configuration prior to detection of the unauthorized resource.

15. The method according to claim 10, comprising receiving an instruction to disable the detected unauthorized resource.

16. The method according to claim 15, wherein the detected unauthorized resource comprises a hard drive which is larger in storage capacity than originally authorized by the service provider.

17. A non-transitory computer readable storage medium storing a program, which when executed, causes a set top box to:

detect a configuration of a resource of the set top box wherein the configuration comprises at least one of a number of storage devices at the set top box and a size of each of the storage devices at the set top box, and transmit the configuration of the detected resource to equipment at a remote location, enabling the equipment to detect a disparity with the configuration; and receive from equipment of a service provider an operating instruction instructing the set top box to perform at least one of modifying, disabling, or fail to use the unauthorized resource when the equipment of the service provider detects the unauthorized resource, wherein when the detected resource is of a greater capacity than indicated by an initial subscription level, the operating instruction limits access to additional capacity of the detected resource, and when a higher subscription level is purchased, the operating instruction grants greater access to the detected resource.

18. The non-transitory computer readable storage medium according to claim 17, wherein the detected resource is a hard disk drive fixed to the set top box.

19. The non-transitory computer readable storage medium according to claim 17, wherein the detected resource is memory having no moving parts.

20. The non-transitory computer readable storage medium according to claim 17, wherein the detected resource relates to tuner capabilities.

* * * * *